(12) United States Patent
Marks et al.

(10) Patent No.: US 7,450,128 B2
(45) Date of Patent: Nov. 11, 2008

(54) SYSTEMS AND METHODS OF PROVIDING IMAGE COPY AND MODIFY COMMANDS TO A RECEIVER WITH AN ASSOCIATED DISPLAY

(75) Inventors: John Marks, Fort Collins, CO (US); David Pinedo, Fort Collins, CO (US); Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 10/988,776

(22) Filed: Nov. 15, 2004

(65) Prior Publication Data

US 2006/0103657 A1     May 18, 2006

(51) Int. Cl.
G06T 1/00     (2006.01)
G06F 15/00    (2006.01)
G09G 5/36     (2006.01)

(52) U.S. Cl. .................. 345/522; 345/501; 345/545

(58) Field of Classification Search .............. 345/545, 345/620; 709/219; 358/462
See application file for complete search history.

(56) References Cited

U.S. PATENT DOCUMENTS

| 5,748,892 | A  | 5/1998  | Richardson       |
|-----------|----|---------|------------------|
| 5,826,027 | A  | 10/1998 | Pedersen et al.  |
| 5,862,348 | A  | 1/1999  | Pedersen         |
| 5,913,060 | A  | 6/1999  | Discavage        |
| 5,923,842 | A  | 7/1999  | Pedersen et al.  |
| 5,941,949 | A  | 8/1999  | Pedersen         |
| 5,961,586 | A  | 10/1999 | Pedersen         |
| 6,014,694 | A  | 1/2000  | Aharoni et al.   |
| 6,016,535 | A  | 1/2000  | Krantz et al.    |
| 6,023,721 | A  | 2/2000  | Cummings         |
| 6,023,749 | A  | 2/2000  | Richardson       |
| 6,057,857 | A  | 5/2000  | Bloomfield       |
| 6,065,118 | A  | 5/2000  | Bull et al.      |
| 6,081,623 | A  | 6/2000  | Bloomfield et al.|
| 6,118,899 | A  | 9/2000  | Bloomfield et al.|
| 6,141,737 | A  | 10/2000 | Krantz et al.    |
| 6,157,944 | A  | 12/2000 | Pedersen         |
| 6,172,683 | B1 | 1/2001  | Bloomfield       |
| 6,307,570 | B1 | 10/2001 | Stergiades       |
| 6,356,933 | B2 | 3/2002  | Mitchell et al.  |

(Continued)

OTHER PUBLICATIONS

"About RealVNC"; RealVNC Ltd.; Copright 2002-2004; 3 pp.; http://www.realvnc.com.

*Primary Examiner*—Kee M Tung
*Assistant Examiner*—Jacinta Crawford

(57) ABSTRACT

A method comprises providing image copy and modify commands to a receiver. Each copy command causes pixel values in an area of a display associated with the receiver to be copied to another area of the display and each modify command causes at least one pixel value in an area of the display to be modified. The method further comprises generating a future copy region if a future copy command that is providable to the receiver is encountered. The future copy region defines one or more rectangles of pixels on the display that are copyable in the future on the display associated with the receiver. The method also comprises using the future copy region to avoid sending a future copy command to the receiver that will copy pixel values that are to be modified on a display associated with a sending system.

21 Claims, 6 Drawing Sheets

U.S. PATENT DOCUMENTS

| | | |
|---|---|---|
| 6,370,552 B1 | 4/2002 | Bloomfield |
| 6,370,570 B1 | 4/2002 | Muir et al. |
| 6,377,971 B1 | 4/2002 | Madden et al. |
| 6,437,803 B1 | 8/2002 | Panasyuk et al. |
| 6,438,598 B1 | 8/2002 | Pedersen |
| 6,538,667 B1 | 3/2003 | Duursma et al. |
| 6,643,690 B2 | 11/2003 | Duursma et al. |
| 6,684,259 B1 | 1/2004 | Discavage et al. |
| 6,691,157 B2 | 2/2004 | Muir et al. |
| 6,766,333 B1 | 7/2004 | Wu et al. |
| 6,785,713 B1 | 8/2004 | Freeman et al. |
| 6,785,726 B1 | 8/2004 | Freeman et al. |
| 6,789,112 B1 | 9/2004 | Freeman et al. |
| 6,799,209 B1 | 9/2004 | Hayton |
| 6,799,270 B1 | 9/2004 | Bull et al. |
| 6,807,580 B2 | 10/2004 | Freeman et al. |
| 6,864,899 B1 * | 3/2005 | Barrus et al. ............... 345/620 |
| 7,117,256 B1 * | 10/2006 | Blinn ............................ 709/219 |
| 2003/0037148 A1 | 2/2003 | Pedersen |
| 2003/0063119 A1 | 4/2003 | Bloomfield et al. |
| 2003/0107579 A1 * | 6/2003 | Willis et al. ................. 345/545 |
| 2003/0163569 A1 | 8/2003 | Panasyuk et al. |
| 2003/0177172 A1 | 9/2003 | Duursma et al. |
| 2005/0162702 A1 * | 7/2005 | Lee et al. ..................... 358/2.1 |

* cited by examiner

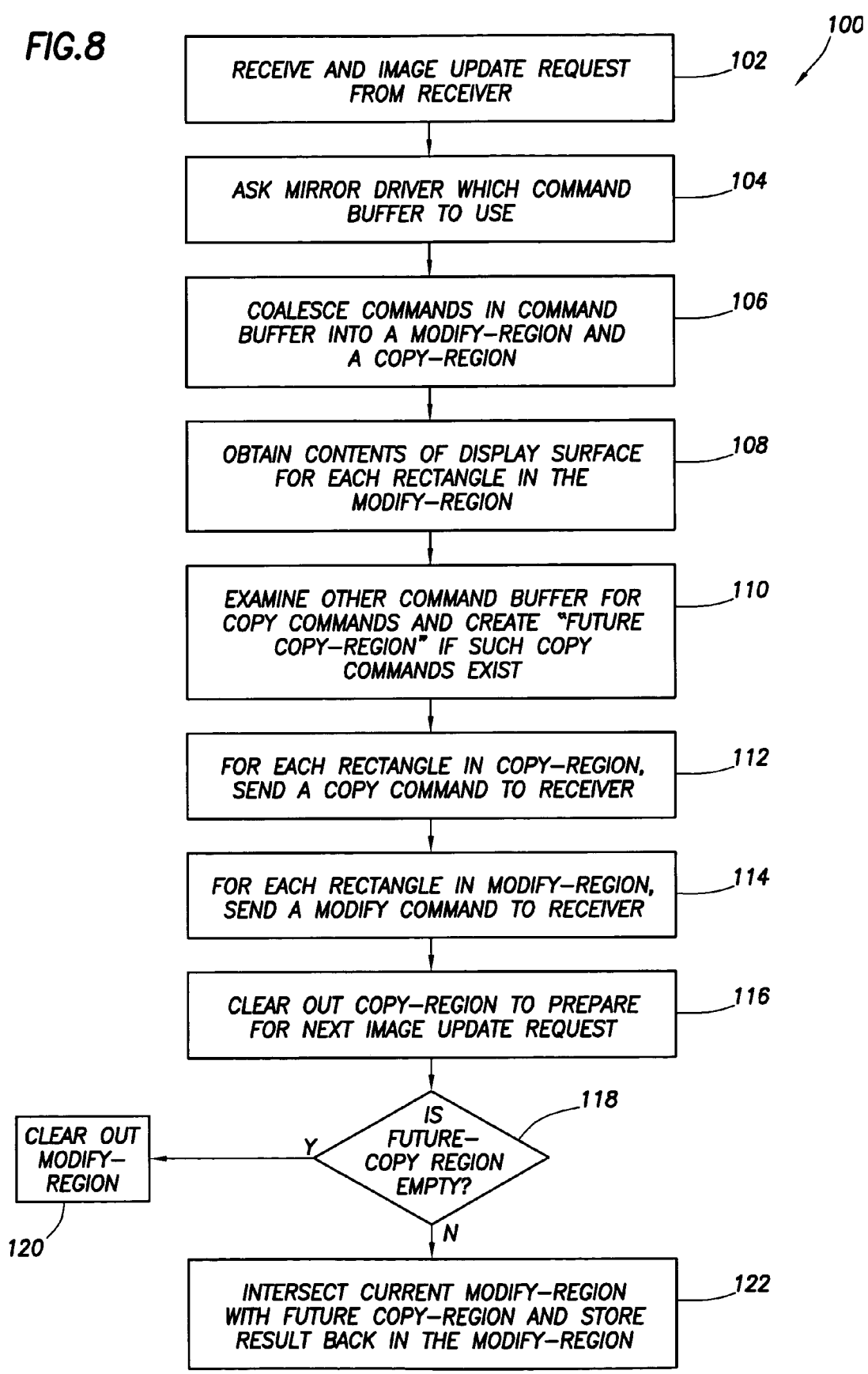

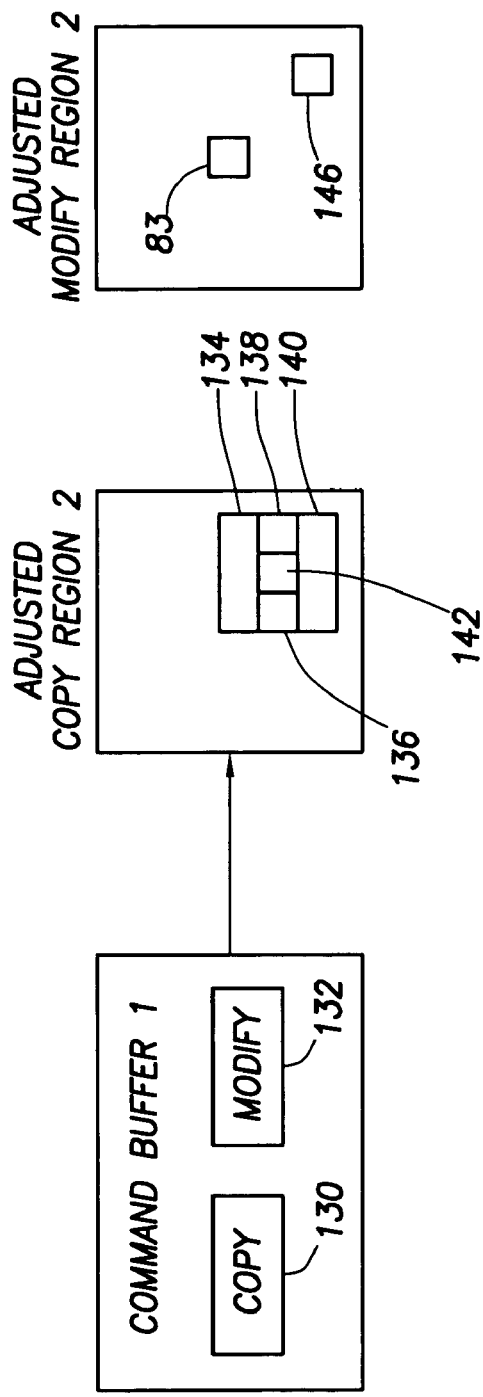
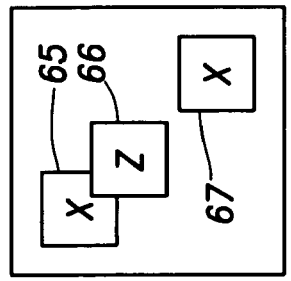
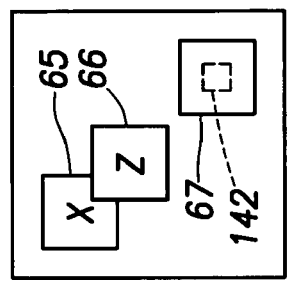
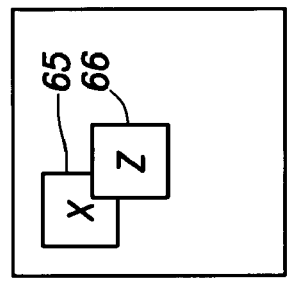
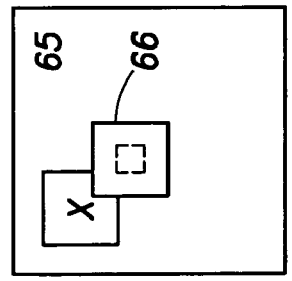
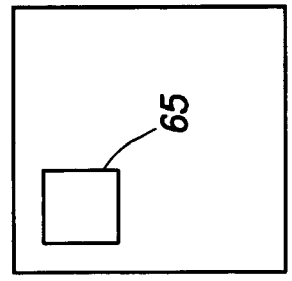

SYSTEMS AND METHODS OF PROVIDING IMAGE COPY AND MODIFY COMMANDS TO A RECEIVER WITH AN ASSOCIATED DISPLAY

BACKGROUND

Some electronic systems permit a user of one computer to view on his or her display images (graphics and text) that are generated on another computer remotely located from the user's computer. In some such systems, the computer where the graphics data is generated transmits commands to the user's computer that causes the user's computer to copy or move pixel data around on the user's display to replicate the images on the computer where the images originated. In some situations, a conflict can arise that causes the user's display to show inaccurate information.

BRIEF SUMMARY

In accordance with at least some embodiments of the invention, a method comprises providing image copy and modify commands to a receiver. Each copy command causes pixel values in an area of a display associated with the receiver to be copied to another area of the display and each modify command causes at least one pixel value in an area of the display to be modified. The method further comprises generating a future copy region if a future copy command that is providable to the receiver is encountered. The future copy region defines one or more rectangles of pixels on the display that are copyable in the future on the display associated with the receiver. The method also comprises using the future copy region to avoid sending a future copy command to the receiver that will copy pixel values that are to be modified on a display associated with a sending system.

In another embodiment, a system comprises a mirror driver and a sender. The mirror driver receives graphics commands and, based on the graphics commands, generates a copy region and a modify region. The sender transmits copy commands and modify commands to a receiving system. The sender determines whether any copy commands exist to be implemented in the future on a receiving system's display and, if a future copy command exists, the sender generates a modify region based on a comparison of the future copy command with a current modify region.

BRIEF DESCRIPTION OF THE DRAWINGS

For a detailed description of exemplary embodiments of the invention, reference will now be made to the accompanying drawings in which:

FIG. 8 illustrates a method embodiment;

FIG. 9 illustrates the use of adjusted copy and modify regions; and

FIGS. 10a-10e illustrate the response of the receiving system.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" is used in a broad sense to refer to a collection of two or more components. By way of example, the term "system" may refer to a computer system, a collection of computers, or a subsystem of a computer.

DETAILED DESCRIPTION

Figure 1:
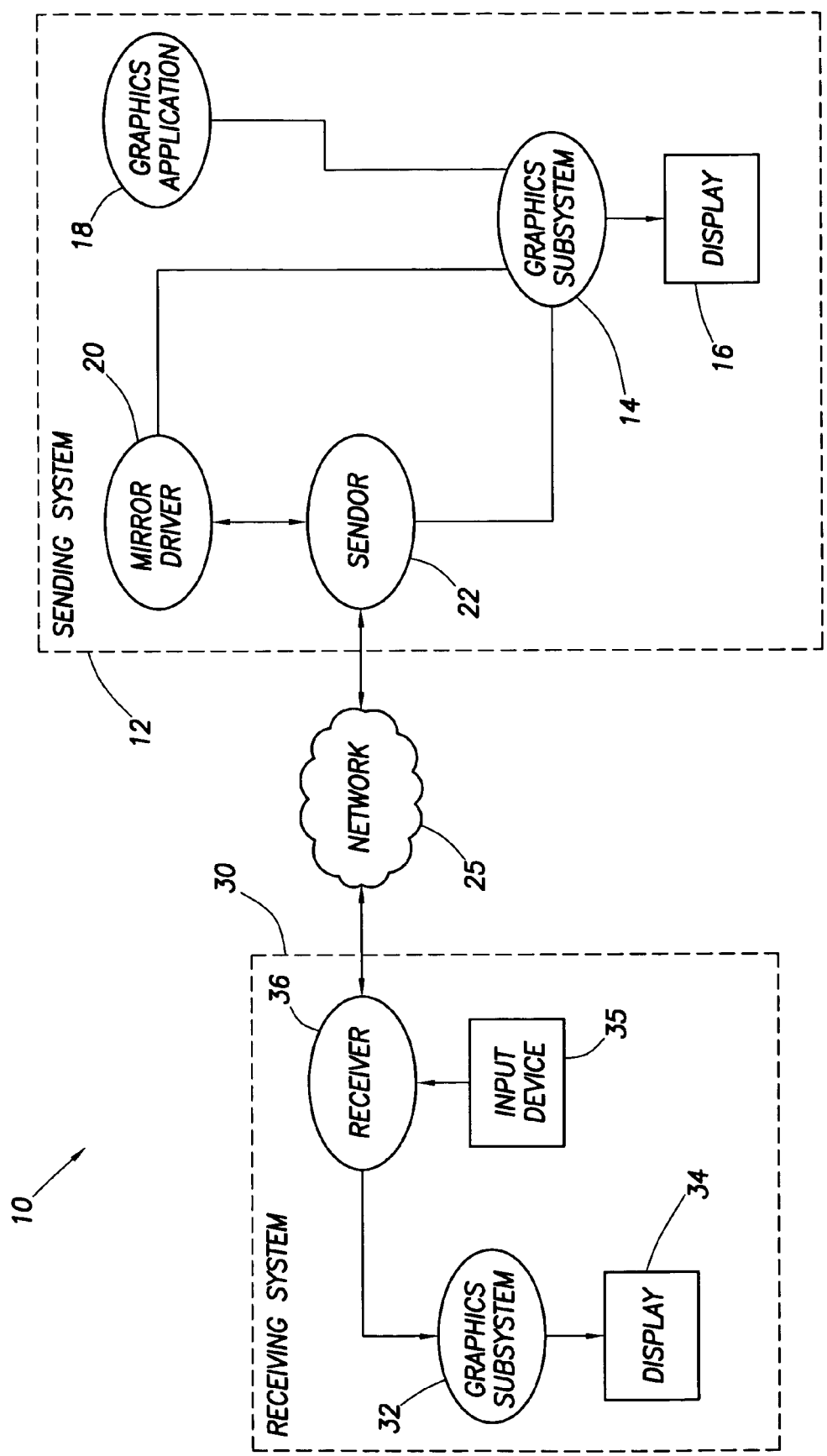
FIG. 1 shows a system in accordance with various embodiments of the invention comprising a sending system and a receiving system.
Figure 2:
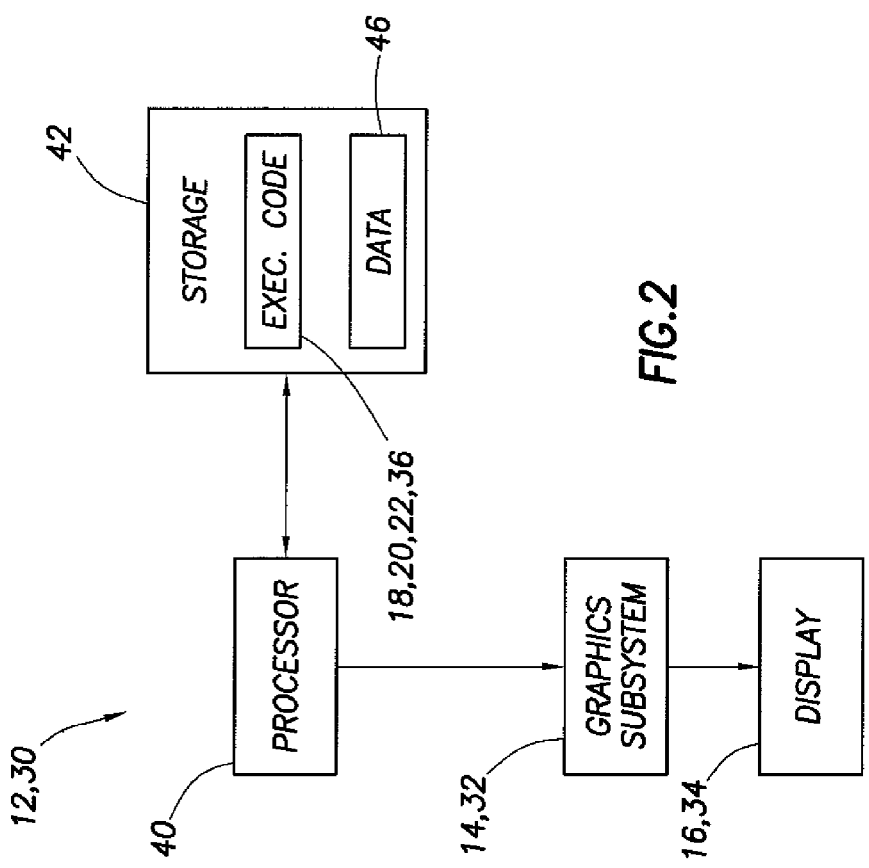
FIG. 2 shows an embodiment exemplary of each of the sending and receiving systems.

FIG. 1 shows an embodiment comprising a system 10. System 10 comprises a sending system 12 and a receiving system 30 in communication with each other by way of a network 25. Network 25 may comprise the Internet or other form of communication network. As shown, the sending system 12 comprises a graphics subsystem 14, a display 16, a graphics application 18, a mirror driver 20, and a sender 22. The graphics application 18, mirror driver 20, and sender 22 comprise executable code. The receiving system 30 comprises a graphics subsystem 32, a display 34, and a receiver 36. The receiver 36 in the receiving system comprises executable code. Referring briefly to FIG. 2 in conjunction with FIG. 1, each of the sending system 12 and receiving system 30 comprises a processor 40, storage 42, and, as noted above, a graphics subsystem 14, 32 and a display 16, 34. Each executable code (i.e., the graphics application 18, the mirror driver 20, the sender 22, and the receiver 36) in the illustrated embodiment are executed by the respective processor 40 in that system and are stored in storage 42. Storage 42 may comprise volatile storage (e.g., random access memory), non-volatile storage (e.g., hard disk drive) or a combination thereof. Each of the graphics subsystems 14 and 32 may comprise additional executable code such as application programming interfaces (APIs), graphics drivers, one or more hardware components such a graphics adapter, etc. Each graphics subsystem also includes at least one frame buffer into which pixel color values are temporarily stored to render pixels on the associated display.

Referring to FIG. 1, sending system 12 executes a graphics application 18 that causes images (e.g., text, lines, fills) to be shown by the graphics subsystem 14 on the display 16. Via network 25, the sending system 12 also sends image update commands to the receiving system 30. The image update commands generally dictate to the receiving system how to alter the information shown on display 34 so as to replicate that which is being shown on display 16. In some embodiments, image update commands are sent to the receiving system 30 while image data is generated by graphics subsystem 14, but without a display 16 attached to the sending system 12. The receiving system 30 may include an input device 35, such as a keyboard or mouse, which permits a user of the receiving system to effectively interact with the graphics application 18 as if the graphics application were being executed on the receiving system 30.

Figure 3:
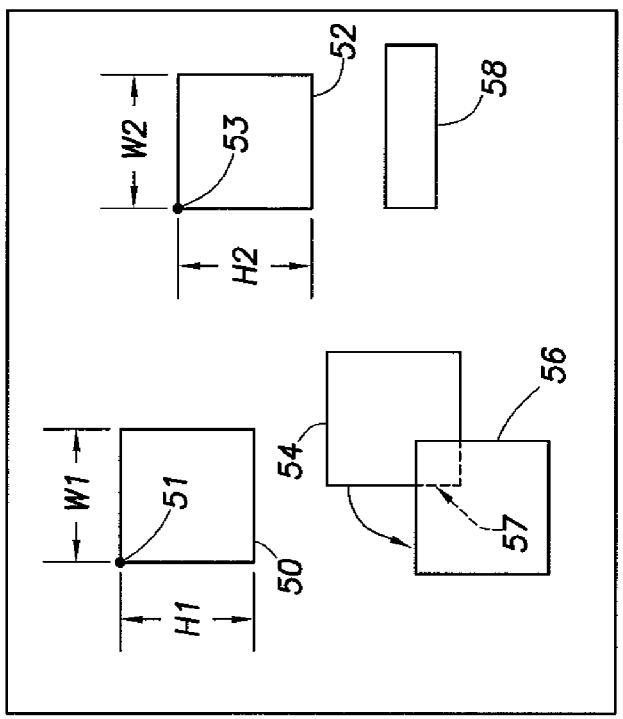
FIG. 3 shows examples of the results of various image update commands.

The image update commands operate on groups of pixels on the display. Any one of a plurality of color values can be applied to each pixel. In the embodiments, the pixel groupings are in the form of rectangles, but other pixel groupings (e.g., triangles) can be implemented as well. The image update commands include copy commands and modify commands. A copy command causes the color values of the pixels in a source rectangle to be copied to a target rectangle located at another location on the display. The source rectangle is defined in the copy command by an initial coordinate, such as the coordinate of the upper left-most pixel in the rectangle, and the width and height of the rectangle. FIG. 3 illustrates the results of the execution of two exemplary copy commands. One copy command causes the pixel color values of the pixels in rectangle 50 to be copied to rectangle 52. Another copy command copies rectangle 54 to rectangle 56 even though rectangle 56 overlaps rectangle 54. The lower left portion 57 of rectangle 54 is overwritten by a portion in the upper right of rectangle 56. A modify command alters one or more pixels within a given rectangle. For example, a modify command can be executed to modify rectangle 58 in some manner.

A copy command has relatively few values associated with it, namely, the identifying coordinate of a pixel in the source rectangle, the height and width of the original rectangle (measured in units of pixels), an identifying coordinate of a pixel in the target rectangle, and the height and width of the target rectangle. In the example of FIG. 3, the source rectangle 50 is defined by the coordinate of pixel 51 and height H1 and width W1. The target rectangle 52 is defined by the coordinate of pixel 53 and height H2 and width W2. A modify command, however, generally has more data included with the command, for example, the color values of each of the pixels contained within the rectangle to be modified. In some embodiments, the pixel data in the modify command may be compressed by the sending system (e.g., the sender 22). If the pixel data is compressed, the receiving system (e.g., the receiver 36) decompresses the compressed data to execute the modify command.

Referring again to FIG. 1, in operation, the sending system 12 determines changes that occur to the images on the graphics subsystem 14 and forms copy and modify commands, stores such copy and modify commands in a plurality of command buffers, and transmits the commands from the command buffers to the receiving system 30 when appropriate. The receiving system 30 executes the received copy and modify commands, and implements the changes defined by the commands on the display 34. A copy command is received and executed by the receiving system's processor 40 to copy a rectangle of pixels already rendered in graphics subsystem 32 of the receiving system to another location in graphics subsystem 32. Similarly, a modify command is received and executed by the receiving system to modify a rectangle of pixels already rendered in graphics subsystem 32 in accordance with the pixel data included with the modify command. Once the receiving system 30 has executed all of the copy and modify commands provided to it by the sending system 12, the receiving system submits an Image Update Request (IUR) across the network 25 to the sending system to indicate that the receiving system is ready to process additional image update commands, if any. In response, the sending system 12 sends more copy and modify commands to the receiving system 30. This process repeats as the receiving system 30 implements changes to the images shown on display 34 to replicate the images generated by the sending system's graphics subsystem 14 as shown on display 16. The receiver 36 formulates IURs to be sent to the sending system 12 in response, at least in part, on user input via the input device 35.

The graphics application 18 running on the sending system 12 comprises any one or more of a plurality of executable programs that use a graphics API. The APIs used by the graphics application are implemented by the graphics subsystem 14. The graphics application causes images to be shown on display 16 by providing graphics commands to the graphics subsystem 14. The mirror driver 20 receives a copy, or otherwise becomes aware, of all graphics commands that are provided to the graphics driver within the graphics subsystem 14. Whereas the graphics driver responds to the graphics commands by sending commands to the graphics adapter to cause pixels to be shown on the display 16, the mirror driver 20 does not send graphics commands to a graphics adapter. Instead, the mirror driver 20 tracks all of the regions of the display "surface" that have been drawn on, and the type of graphics commands (copy, modify) along with any attributes of the graphics commands that are drawn in each region. The mirror driver 20 formulates rectangle copy and modify commands and loads them into at least one command buffer for subsequent use by the sender 22 as explained below.

In the illustrated embodiment, the sender 22 is a software application that runs on the sending system's processor 40 and that communicates with the mirror driver 20. The sender 22 receives the IURs from the receiver 36 over network 25. In response, the sender 22 requests regions to be modified or copied from the mirror driver 20. For those regions that are to be modified, the sender 22 obtains the pixel data associated with the images from the graphics subsystem 14. Obtaining a modify region from the graphics subsystem entails reading a graphics frame buffer in the graphics subsystem 14. The graphics frame buffer in the sender's graphics subsystem includes pixel values that are to be applied to pixels on a display. The sender's display 16, however, may not be included as desired. Nevertheless, the sender's frame buffer will still be loaded with pixel data. If compression is implemented, the sender 22 compresses the images obtained from graphics subsystem 14.

The sender 22 requests "copy regions" and "modify regions" from the mirror driver 20 in response to receiving an IUR from the receiver 36. A copy region comprises one or more rectangles of pixels that are to be copied to other areas of a display. A modify region comprises one or more rectangles of pixels that are to be modified in some way as noted above. Although at least one rectangle is included in a copy region or a modify region, in some situations, no rectangles of pixels need to be copied or modified. Accordingly, broadly stated, each copy and modify region is defined as comprising zero or more rectangles.

Figure 4:
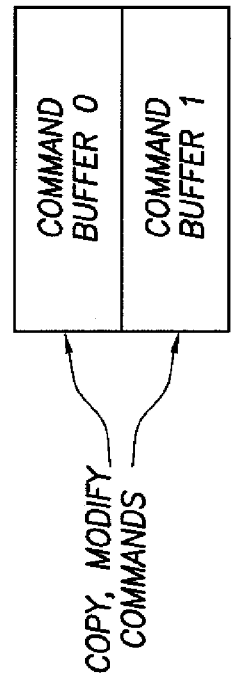
FIG. 4 illustrates the use of two command buffers in the sending system to coordinate command transfers to the receiving system.

The sending system 12 uses a plurality of command buffers to transmit copy and modify commands to the receiving system 30. FIG. 2 illustrates that the storage 42 in the sending system 12 comprising storage 46 for data. The data storage 46 is used for the command buffers and, if desired, for other reasons. FIG. 4 illustrates an embodiment of the use of two command buffers—command buffer 0 and command buffer 1. Copy and modify commands are loaded into the command buffers by the mirror driver 20. Although two command buffers are shown, some embodiments may use a single command buffer or more than two command buffers, if desired.

In accordance with an embodiment of the invention, the sender 22 examines the contents of the command buffers to determine the areas of the screen that should be obtained for modify commands and the part of the screen that should be copied for copy commands. Obtaining an area of the screen for a modify command entails reading the frame buffer in the graphics subsystem to obtain the pixel color values of the pixels being modified. The sender 22 and mirror 20 driver are generally separately executing processes of the sending system 12 and, as such, the sender does not read commands from one command buffer while the mirror driver is adding copy and modify commands to the same buffer. Instead, while the mirror driver 20 is loading copy and modify commands into one of the command buffers, the sender 22 reads commands from the other buffer.

When the sender 22 receives an IUR from receiver 36, the sender inquires of the mirror driver 20 as to which command buffer to use to provide copy and modify commands to the receiver 36, and the mirror driver 20 informs the sender 22 as to which buffer to use. In some embodiments, that buffer will be the buffer that the mirror driver is currently using to load commands. The mirror driver will begin loading commands into the other buffer while the sender 22 is reading the command buffer that the sender was told to use. As the sender 22 reads the copy and modify commands from the appropriate command buffer, the sender reads the frame buffer in the graphics subsystem as needed upon encountering a modify command. The sender may compress the pixel data for a modify command and transmit modify and copy commands to the receiver over the network 25. In conjunction with the graphics subsystem 32, the receiver 36 then the commands provided to it by the sender 22.

Between the time that the mirror driver 20 detects that a modification is being made to a rectangle of pixels on graphics subsystem 14 and loads a corresponding modify command into a command buffer and the time that the sender 22 reads that modify command from the buffer and obtains the modified pixels from the frame buffer, those very same pixels may have been further modified by the normal execution of the graphics application 18. A disconnect thus occurs in that the pixel data obtained from the frame buffer by the sender 22 may not be the same pixel data that corresponded to the modify command in the first place. This disconnect can have a rippling effect, particularly as copy commands are executed that involve the same pixels. The following example illustrates this problem.

Figure 5E:
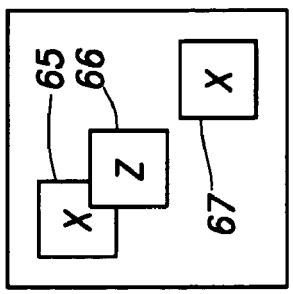
FIGS. 5a-5e show an example of the movement and modification of various rectangles on a sender's display surface.
Figure 5D:
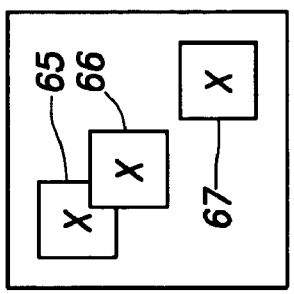
Figure 5C:
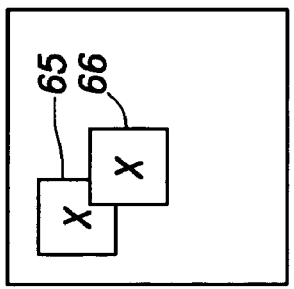
Figure 5B:
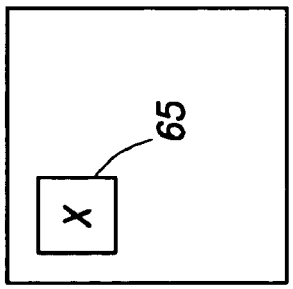
Figure 5A:
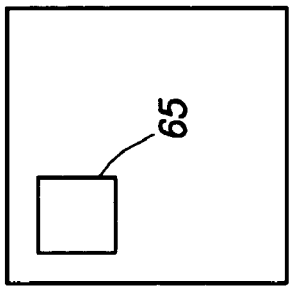

FIGS. 5a-5e show a time sequence of events on the sending system's display 16. In FIG. 5a, a rectangle 65 is near the upper left-hand corner of the display. Rectangle 65 comprises a plurality of pixels some of which may be rendered as dictated by the graphics application 18. In FIG. 5b, the user of the receiving system 30 has typed an "X" in rectangle 65. FIG. 5c shows that rectangle 65 is to be copied toward the center of the screen to create rectangle 66. FIG. 5d shows that the rectangle has again been copied to a location near the lower right-hand corner of the screen to create rectangle 67. Finally, in FIG. 5e the user has typed a "Z" in rectangle 66. The image of FIG. 5e is ultimately what should be shown on the receiving system's display 34 by way of various copy and modify commands to implement the screen alterations exemplified in transitioning from FIG. 5a to FIG. 5e.

Figure 6:
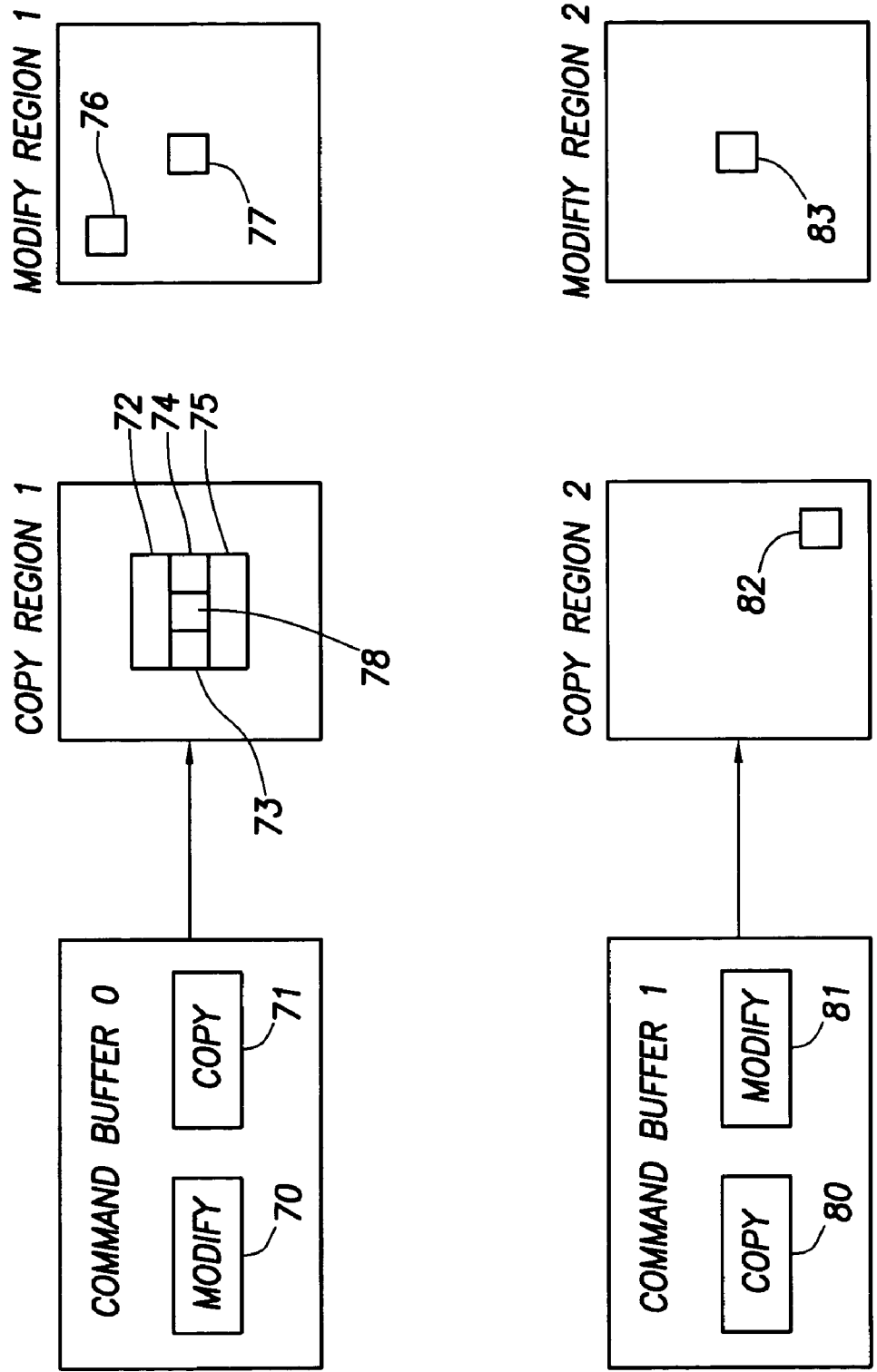
FIG. 6 illustrates the various modify and copy commands and regions used to implement the display surface modifications of FIGS. 5a-5e.

FIG. 6 illustrates exemplary copy and modify commands and copy and modify regions used to implement the screen alterations exemplified in FIGS. 5a-5e on the receiving system. As shown, command buffers 0 and 1 are used into which copy and modify commands are loaded by the mirror driver 20. Upon drawing an "X" in rectangle 65 in FIG. 5b, the mirror driver loads a corresponding modify command 70 into command buffer 0. When rectangle 65 is copied to rectangle 66 in FIG. 5c, the mirror driver 20 loads a corresponding copy command 71 into command buffer 0.

As noted above, the sender 22 generates modify regions and copy regions based on the commands in the applicable command buffer. In accordance with embodiments of the invention, the sender 22 employs the following two properties:

The geometric intersection of the modify region and the copy region is the "empty set" (i.e., there is no overlap); and The copy region can be applied by the receiver 36 before the modify region is applied by the receiver.

As a result of these two properties, the sender 22 generates copy region 1 and modify region 1 based on the modify and copy commands 70, 71. Copy region 1 is represented as four rectangles 72-75. The center portion 78 is not included in the copy region 1 because of the property that the copy region may be effectuated by the receiver 36 before the modify region. That is, it is possible that, on the receiving system, the receiver 36 will perform the copy of rectangle 65 to rectangle 66 before the time that the "X" has been rendered in rectangle 65 on the receiving system display 34. If that were to happen, the "X" would not be copied to rectangle 66. For that reason, the center of the rectangle is omitted from the copy region and the sender 22 thus implements the copy command as four copy commands—one for each of the four surrounding rectangles 72-75. The "X" is accounted for in modify region 1 which includes two smaller rectangles of pixels 76 and 77. Rectangle 76 represents the center of rectangle 65 and rectangle 77 represents the center of rectangle 66. In this way, the copy and modify regions can be applied in either order—copy first then modify, or vice versa.

Figure 7E:
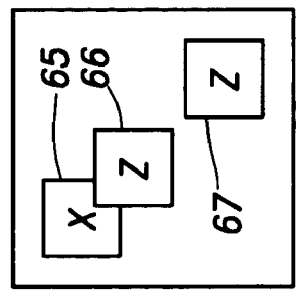
FIGS. 7a-7e illustrate the resulting alterations on the receiving system's display based on the modify and copy commands of FIG. 6.
Figure 7D:
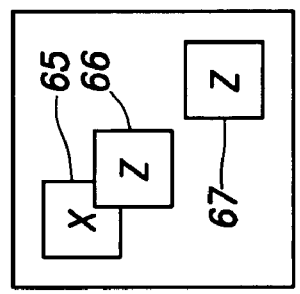
Figure 7C:
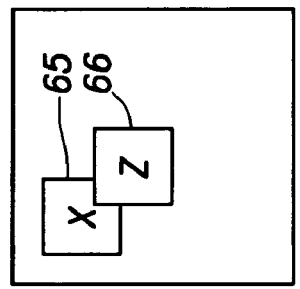
Figure 7B:
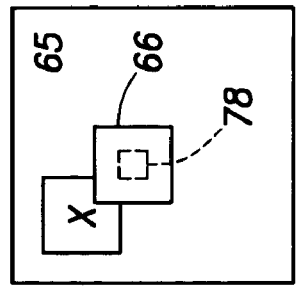
Figure 7A:
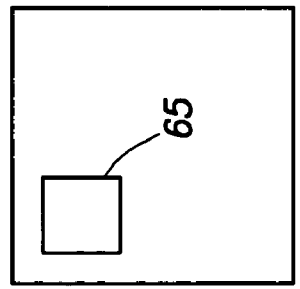

FIGS. 7a-7e shows the display surface on the receiving system as the receiver 36 executes the various modify and copy commands provided to it by the sender. The receiver 36 transmits an IUR to sender 22 which responds by transmitting the modify and copy commands 70, 71 from command buffer 0. FIG. 7a shows the original rectangle 65. In FIG. 7b, the result of the application of copy region 1 is shown as rectangle 66 with an omitted center portion 78. In conjunction with graphics subsystem 33, the receiver 36 performs the modify commands 70 which implement rectangles 76 and 77 in modify region 1 which results in the image of FIG. 7c.

After the receiver has executed those commands, as shown in FIGS. 7a-7c, the receiver 36 transmits another IUR to sender 22. This time, the sender 22 switches over to command buffer 1, at the direction of mirror driver 20, which contains copy and modify commands 80, 81 to effectuate the remaining alterations of FIGS. 5d and 5e. The copy region 2 includes a rectangle 82 which corresponds to the copy of rectangle 66 to rectangle 67 (FIG. 5d). The modify region 2 includes a rectangle 83 which corresponds to center portion of rectangle 66 into which the "Z" is to be drawn (FIG. 5c).

As noted above, FIG. 7c shows the receiving system's display surface after applying modify region 1. Two rectangles were obtained from the sending system's frame buffer by the sender 22, compressed, sent as modify commands to the receiver 36, and then applied to the receiver's display surface. A "Z" was displayed in rectangle 66 in FIG. 7c instead of an "X." This occurred because by the time the sender 22 obtained the pixel data from the frame buffer that corresponds to rectangle 77 in modify region 1, the "Z" had already been drawn by the graphics subsystem 14. Thus, as copy region 2 is implemented on the receiving system, the rectangle 66 on the receiving system's display 34, which already has a "Z" contained in it, is copied, "Z" and all, to rectangle 67. Finally, modify region 2 is implemented which draws a "Z" into rectangle 67, which has no noticeable effect since the "Z" is already there. Comparing FIG. 7e to the desired FIG. 5e, however, illustrates the scenario that rectangle 67 on the receiving system contains a "Z" instead of the correct "X."

Referring now to FIG. 8, a method embodiment 100 is shown to correct for the scenario noted above. The method comprises actions 102-122. At 102, the method 100 comprises receiving an IUR from receiver 36. In response to the receipt of the IUR, the sender 22 asks the mirror driver 20 which command buffer to use (action 104). The mirror driver 20 identifies the command buffer that the sender is to use and the sender then "coalesces" the commands from the specified command buffer into a modify region and a copy region (action 106). Coalescing commands from the command buffer into a modify region and a copy region entails applying a geometric union of each rectangle associated with each modify command in the command buffer to form a modify region, and applying a geometric union of each rectangle associated with each copy command in the command buffer to form a copy region. At 108, method 100 comprises obtaining the contents of the display surface for each rectangle in the modify region. This action includes the sender 22 reading a portion of the frame buffer in the graphics subsystem 14 as explained above.

Referring still to FIG. 8, method 100 comprises at 110 the sender 22 examining the other command buffer for copy commands and creating a "future copy region" if such copy commands exist. Such other command buffer is the buffer into which copy and modify commands are being stored by the mirror driver 20 for execution by the receiving system in the future. Such copy commands are copy commands that are potentially to be completed at a future point in time from the commands in the current command buffer. Not all of these "future" commands are submitted to the receiver 36 due to the actions described herein. At 112, for each rectangle in the current copy region, the sender 22 sends a copy command to the receiver 36. At 114, for each rectangle in the modify region, the sender 22 sends a modify command to the receiver 36.

Method 100 continues by the sender 22 clearing out the copy region to prepare for the next image update request made the receiver 36. At decision action 118, the sender 22 determines whether the future copy region is empty or contains at least one rectangle. If the future copy region is empty (i.e., no future copy commands were found in the other command buffer), then at action 120 the sender 22 clears out the modify region. If, however, the future copy region is not empty, then control passes to action 122 in which the geometric intersection between the current modify region and the future copy region is computed and the results are stored back in the modify region. The results of the intersection represent those rectangles of pixels that are common to the current modify region and the future copy region and thus those rectangle pixels that are currently to be modified and later to be copied.

FIG. 9 shows a different version of the command buffer 1 and associated copy and modify regions in accordance with various embodiments of the invention. Command buffer 1 in FIG. 9 includes copy and modify commands 130 and 132 so as to implement adjusted copy region 2 and adjusted modify region 2. The difference between adjusted copy region 2 in FIG. 9 and copy region 2 in FIG. 6 is that in FIG. 6, the copy region 2 is the entire rectangle 82, whereas in FIG. 9, the adjusted copy region 2 comprises the four rectangles 134, 136, 138, and 140 surrounding an omitted center portion 142. That center portion 142 is shown in the adjusted modify region 2 as rectangle 146. As such, the adjusted modify region 2 comprises two rectangles 83 and 146, whereas modify region 2 in FIG. 6 includes only rectangle 83.

FIGS. 10a-10e illustrate the correct action of the receiving system 30 in accordance with various embodiments of the invention. FIGS. 10a-10c are similar to FIG. 7a-7c. In FIG. 10d, however, the receiver 36 applies the adjusted copy 2 from FIG. 9 resulting in a rectangle 67 with an omitted center 142. That is, the rectangular center 142 of rectangle 67 is not copied with the outer rectangles 134, 136, 138, and 142 as described above in FIG. 9. In FIG. 10e, rectangles 83 and 146 from adjusted modify region 2 are applied to the receiver's display surface resulting in the "Z" in rectangle 66 and the "X" in rectangle 67. As can be seen, FIG. 10e is the same as FIG. 5e and, as such, the receiver's display surface is identical to the sending system's display surface.

What is claimed is:

1. A method, comprising: providing image copy commands and modify commands to a receiver, each copy command causes pixel values in an area of a display associated with the receiver to be copied to another area of the display and each modify command causes at least one pixel value in an area of the display to be modified; generating a future copy region if a future copy command that is providable to the receiver is encountered, said future copy region defining one or more rectangles of pixels on the display that are copyable in the future on the display associated with the receiver; and using the future copy region to avoid sending a future copy command to the receiver that will copy pixel values that are to be modified on a display associated with a sending system.

2. The method of claim 1 wherein using the future copy region to avoid sending the future copy command comprises generating a subsequent copy region that excludes those pixels that correspond to a current modify region, said subsequent copy region comprises one or more rectangles of pixels that are to be copied in the future.

3. The method of claim 2 wherein using the future copy region comprises generating an altered modify region that includes those pixels excluded from the subsequent copy region, said altered modify region comprising at least one rectangle of pixels that are to be modified in the future.

4. The method of claim 3 further comprising generating a subsequent modify command for each rectangle in the altered modify region.

5. The method of claim 2 further comprising generating a future copy command associated with such rectangle in the subsequent copy region.

6. A method, comprising:
   receiving an image update request from a receiver;
   coalescing commands from a first command buffer into a modify region and a copy region, said modify region comprising zero or more rectangles of pixels associated with a display that are to be modified on a display associated with the receiver and said copy region comprising zero or more rectangles of pixels associated with a display that are to be copied from one location to another on a display associated with the receiver;
   examining a second command buffer for a future copy command that is to be performable by the receiver at a later point in time than the commands in the first command buffer; and generating a future modify region based on a comparison of the future copy command with a current modify region.

7. The method of claim 6 wherein generating the future modify region based on the comparison comprises computing the intersection between a future copy region associated with the future copy command and the current modify region.

8. The method of claim 6 further comprising generating a future copy region comprising at least one rectangle of pixels that are to be copied in the future, but excludes those pixels that coincide with the current modify region.

9. A system, comprising:
a processor;
a graphics subsystem coupled to said processor;
a mirror driver executed by said processor, said mirror driver receives graphics commands from said processor and, based on the graphics commands, generates a copy command and a modify command, said copy command comprising groups of pixels on a display that are to be copied from one location on the display to another and said modify command comprising at least one group of pixels on the display that are to be modified on the display; and
a sender process also executed by said processor, said sender process transmitting copy commands and modify commands to a receiving system, said copy commands configured to cause the receiving system to copy at least one group of pixels on a display associated with the receiving system from one location on the display to another, and the modify commands configured to cause the receiving system to modify at least one group of pixels on the display associated with the receiving system;
wherein the sender process determines whether any copy commands exist to be implemented in the future on the receiving system's display and, if a future copy command exists, the sender process generates a future copy region that excludes at least one group of pixels that coincide with pixels in a current modify region.

10. The system of claim 9 wherein the sender process generates an altered modify region that comprises the pixels from the current modify region that were excluded from the future copy region.

11. The system of claim 10 wherein the mirror driver generates a modify command based on the altered modify region.

12. The system of claim 9 wherein the mirror driver generates a copy command associated with the pixels in the copy region that excludes the at least one group of pixels.

13. A system, comprising: a processor; a graphics subsystem coupled to said processor; code executed by said processor to thereby cause the processor to receive graphics commands and, based on the graphics commands, to generate a copy region and a modify region, said copy region comprising at least one group of pixels on a display that are to be copied from one location on the display to another and said modify region comprising at least one group of pixels on the display that are to be modified; and a sender process also executed by said processor, said sender process transmitting copy commands and modify commands to a receiving system, said copy commands configured to cause the receiving system to copy at least one group of pixels on a display associated with the receiving system from one location on the display to another, and the modify commands configured to cause the receiving system to modify at least one group of pixels on the display associated with the receiving system;
wherein the sender process determines whether any copy commands exist to be implemented in the future on the receiving system's display and, if a future copy command exists, the sender process generates a future modify region based on a comparison of the future copy command with a current modify region.

14. The system of claim 13 wherein a driver generates the future modify region by computing the intersection between a future copy region associated with the future copy command and the current modify region.

15. The system of claim 13 further comprising at least two command buffers into which copy commands and modify commands are stored pending transmission to the receiving system.

16. The system of claim 13 wherein a mirror driver generates a future copy region comprising at least one group of pixels that is to be copied in the future, but excludes those pixels that coincide with the current modify region.

17. A system, comprising:
means for receiving graphics commands from said processor and, based on the graphics commands, for generating a copy region and a modify region, said copy region comprising at least one group of pixels on a display that are to be copied from one location on the display to another and said modify region at least one group of pixels on the display that are to be modified; and
means for transmitting copy commands and modify commands to a receiving system, said copy commands configured to cause the receiving system to copy at least one group of pixels on a display associated with the receiving system from one location on the display to another, and the modify commands configured to cause the receiving system to modify at least one group of pixels on the display associated with the receiving system; and
means for determining whether any copy commands exist to be implemented in the future on the receiving system's display and, if a future copy command exists, for generating a future copy region that excludes at least one group of pixels that coincide with pixels in a current modify region.

18. The system of claim 17 further comprising means for generating a future modify region comprising the pixels from the current modify region that were excluded from the future copy region.

19. A system, comprising:
code that is executable by a processor to thereby receive graphics commands and, based on the graphics commands, to generate a copy region and a modify region; and
a sender that transmits copy commands and modify commands to a receiving system;
wherein the sender determines whether any copy commands exist to be implemented in the future on a receiving system's display and, if a future copy command exists, the sender generates a future modify region based on a comparison of the future copy command with a current modify region.

20. The system of claim 19 wherein the sender generates the future modify region by computing the intersection between a future copy region associated with the future copy command and the current modify region.

21. The system of claim 19 further comprising at least two command buffers into which copy commands and modify commands are stored pending transmission to the receiving system.

* * * * *